UNITED STATES PATENT OFFICE.

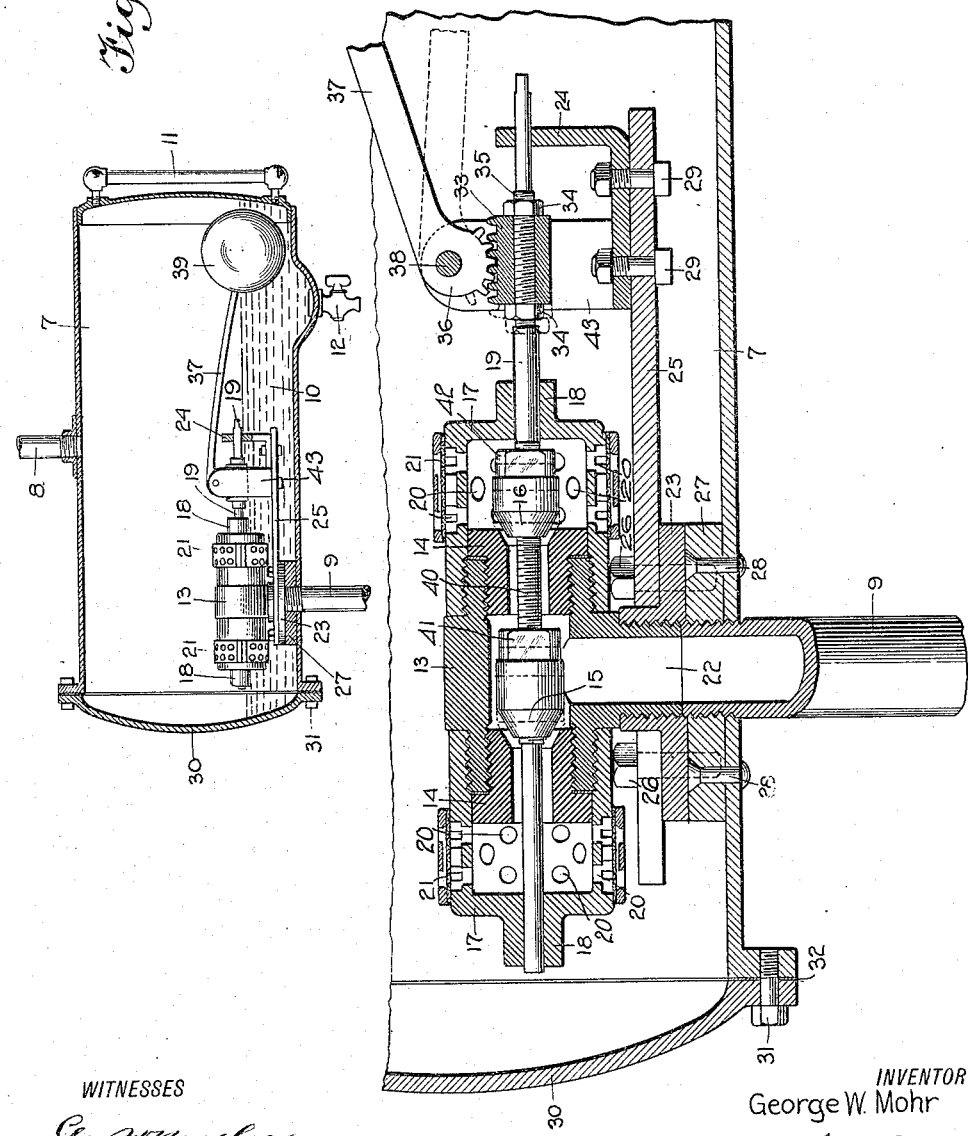

GEORGE WILLIAM MOHR, OF JERSEY CITY, NEW JERSEY.

VALVE MECHANISM FOR TRAPS.

1,176,478.  Specification of Letters Patent.  Patented Mar. 21, 1916.

Application filed November 12, 1915. Serial No. 61,082.

*To all whom it may concern:*

Be it known that I, GEORGE W. MOHR, a citizen of the United States, and a resident of Jersey City, in the county of Hudson and State of New Jersey, have invented a new and Improved Valve Mechanism for Traps, of which the following is a full, clear, and exact description.

The object of the invention is to provide a new and improved valve mechanism for traps, which is exceedingly sensitive and arranged to insure a positive opening and closing of the outlet to periodically drain off the accumulated liquid from the trap without danger of the working parts becoming inoperative by sticking or other causes.

In order to accomplish the desired result, use is made of float-controlled balanced twin valves controlling the outflow of the liquid from the trap. Use is also made of a T-shaped valve casing provided at the ends of its longitudinal inlet passage with two valve seats opening in the same direction, a valve stem extending centrally through the said valve seats, a pair of valves secured on the said valve stem and adapted to simultaneously open and close the said valve seats, one of the valves being within the said passage and the other being exterior thereof so that the said valves balance each other, and a float-controlled mechanism connected with the said valve stem.

A practical embodiment of the invention is represented in the accompanying drawings forming a part of this specification in which similar characters of reference indicate corresponding parts in both views.

Figure 1 is a side elevation of the twin valve mechanism arranged within a tank shown in section; and Fig. 2 is an enlarged sectional side elevation of the same.

As shown in the drawings, the tank 7 is provided with an inlet pipe 8 and a discharge pipe 9, and within the said tank 7 is arranged a twin valve mechanism which consists essentially of a T-shaped valve casing 13 connected at its vertical passage 22 with the discharge pipe 9 and provided in its longitudinal passage with valve seats 14 opening in the same direction and adapted to be simultaneously opened and closed by two valves 15 and 16 secured on a valve stem 19 extending centrally through the said valve seats 14, the latter and the said valves 15 and 16 and their common stem 19 forming a twin or Siamese valve. By the arrangement described, the valve 15 is located within the casing 13 while the other valve 16 is located outside the valve and hence when the valves 15 and 16 are in closed position they practically balance one the other owing to the fluid pressure within the tank 7 acting on the outer exposed surface of the valve 16 and on the exposed conical end of the valve 15. The exposed areas of the valves 15 and 16 may be varied in size to suit existing conditions, but in practice the area of the outer exposed surface of the valve 16 is preferably slightly in excess of that of the conical end of the valve 15 so that a preponderance of pressure is on the valve 16 over that of the valve 15 to hold the valves normally in closed position. The valves 15 and 16 are preferably screwed on the threaded portion 40 of the valve stem 19 and are locked in place by jam nuts 41, 42. The valve stem 19 is mounted to slide in bearings 18 formed on caps 17 screwed or otherwise secured to the ends of the horizontal member of the valve casing 13, and the said caps 17 are provided with openings 20 for the passage of the liquid from the tank 7 into the caps 17, and to allow the liquid to pass from the valve seats 14 to the vertical passage 22 and the outlet pipe 9. Sectional strainers 21 are fitted around the caps 17 and extend over the openings 20 to prevent extraneous matter from passing to the valve seats 14 and the valves 15 and 16 to prevent impairment of the working of the twin valves. The extreme right-hand end of the valve stem 19 is mounted to slide in a bracket 24 fastened by bolts 29 to a base plate 25 resting on top of a flange 23 screwed or otherwise fastened on the vertical member 22 of the valve casing 13. The flange 23 rests on a foundation 27 fastened by rivets 28 to the bottom of the tank 7 and bolts 26 pass through the base plate 25 and the flange 23 and screw into the foundation 27 to securely fasten the parts together.

The right-hand portion of the valve stem 19 supports a rack 33 fastened in place by nuts 34 screwing on a threaded portion 35 of the valve stem 19 and the rack 33 is in mesh with a segmental gear 36 formed on the pivotal end of a float arm 37 provided at its free end with a float 39 of any approved construction. The float arm 37 is mounted to swing on a pivot 38 held on a bracket 43 bolted or otherwise fastened to the base plate 25.

From the foregoing it will be seen that by the arrangement described the valve mechanism and its float control can be readily assembled and mounted on the base plate 25 which in turn can be conveniently attached by bolts 26 to the foundation 27 forming a permanent part of the tank 7. The tank 7 is of conventional shape, closed at one end and provided at the other end with a cover 30 held removably in position by bolts 31. To permit observing the level of the liquid within the tank 7 use is made of a water gage 11, of any approved construction and preferably mounted on the closed end of the tank 7. To allow cleaning of the tank 7 of sediment, use is made of a drain cock 12.

The operation is as follows: Normally the valves 15 and 16 are closed and the liquid flowing into the tank 7 by way of the pipe 8 accumulates therein and causes lifting of the float 39 whereby the arm 37, with its segmental gear wheel 36, acts on the rack 33 and thus pushes the latter and the valve stem 19 from the left to the right thereby moving the valves 15 and 16 off their seats 14. The accumulated liquid can now pass from the tank 7 by way of the strainers 21 and openings 20 into and through the valve seats 14 to finally pass by way of the vertical passage 22 into the outlet pipe 9 and to a suitable place of discharge. As the liquid recedes in the tank 7 the float 39 sinks, and in doing so the valves 15 and 16 are moved back into closed position on their seats 14. As soon as the valves are seated the outflow of the liquid is cut off and the liquid again accumulates in the tank 7, and the above described operation is repeated.

From the foregoing it will be seen that the valves 15 and 16 are positively opened and closed on the rise and fall of the level of the liquid in the tank 7, and by providing balanced valves as described undesirable ramming action is prevented.

Having thus described my invention, I claim as new and desire to secure by Letters Patent:

1. A valve mechanism for traps, comprising a T-shaped valve casing provided at the ends of its longitudinal passage with valve seats opening in the same direction, the horizontal member of the casing forming the inlet and the vertical member of the casing forming the outlet, a valve stem extending centrally through the said valve seats, a pair of valves secured on the said valve stem and adapted to simultaneously open and close the said valve seats, one of the valves being within the longitudinal passage and the other being exterior thereof, caps on the ends of the horizontal members of the valve casing and provided on their peripheral faces with inlet openings, the said caps forming bearings for the said valve stem, strainers encircling the peripheral faces of the said caps, and a float-controlled mechanism connected with the said valve stem.

2. A valve mechanism for traps, comprising a T-shaped valve casing provided at the ends of its longitudinal passage with valve seats opening in the same direction, the horizontal member of the casing forming the inlet and the vertical member of the casing forming the outlet, a valve stem extending centrally through the said valve seats, a pair of valves secured on the said valve stem and adapted to simultaneously open and close the said valve seats, one of the valves being within the longitudinal passage and the other being exterior thereof, caps on the ends of the horizontal member of the valve casing and provided on their peripheral faces with inlet openings, the said caps forming bearings for the said valve stem, strainers encircling the peripheral faces of the said caps, a rack secured on the said valve stem outside of one of the said caps, and a float lever provided at one end with a float and at the other end with a segmental gear wheel in mesh with the said rack.

In testimony whereof I have signed my name to this specification in the presence of two subscribing witnesses.

GEORGE WILLIAM MOHR.

Witnesses:
WILLIAM P. PINDELA,
GEO. C. L. MAËS.

Copies of this patent may be obtained for five cents each, by addressing the "Commissioner of Patents, Washington, D. C."